United States Patent
Carroll

(10) Patent No.: US 9,502,880 B2
(45) Date of Patent: *Nov. 22, 2016

(54) METHODS AND APPARATUS TO DETECT AND CONTROL PLASMA FIRES

(71) Applicant: The Boeing Company, Chicago, IL (US)

(72) Inventor: Galen Duff Carroll, Owens Cross Roads, AL (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/735,111

(22) Filed: Jun. 9, 2015

(65) Prior Publication Data

US 2015/0277391 A1  Oct. 1, 2015

Related U.S. Application Data

(63) Continuation of application No. 13/431,432, filed on Mar. 27, 2012, now Pat. No. 9,088,149.

(51) Int. Cl.
| | |
|---|---|
| *H02H 1/00* | (2006.01) |
| *G01J 5/00* | (2006.01) |
| *G01K 11/32* | (2006.01) |
| *B60R 16/02* | (2006.01) |
| *G05B 9/02* | (2006.01) |

(52) U.S. Cl.
CPC ............ *H02H 1/0023* (2013.01); *B60R 16/02* (2013.01); *G01J 5/0018* (2013.01); *G01K 11/32* (2013.01); *G05B 9/02* (2013.01); *Y10T 307/773* (2015.04)

(58) Field of Classification Search
CPC .... G01J 5/0018; G01K 11/32; H02H 1/0023
USPC ...................... 361/103; 356/43; 374/160, 161
See application file for complete search history.

(56) References Cited

U.S. PATENT DOCUMENTS

| | | | |
|---|---|---|---|
| 4,650,003 | A | 3/1987 | Euson |
| 5,144,125 | A | 9/1992 | Carter et al. |
| 5,627,719 | A | 5/1997 | Gaston |
| 8,201,996 | B1 | 6/2012 | Gaeta |
| 9,088,149 | B2 | 7/2015 | Carroll |
| 2010/0277325 | A1 | 11/2010 | Kopelman |
| 2013/0258529 | A1 | 10/2013 | Carroll |

OTHER PUBLICATIONS

United States Patent and Trademark Office, "Notice of Allowance," issued in connection with U.S. Appl. No. 13/431,432, mailed on Mar. 17, 2015, 28 pages.
United States Patent and Trademark Office, "Non-Final Office Action," issued in connection with U.S. Appl. No. 13/431,432, mailed on Oct. 30, 2014, 22 pages.
United States Patent and Trademark Office, "Final Office Action," issued in connection with U.S. Appl. No. 13/431,432, mailed on Jul. 9, 2014, 20 pages.
United States Patent and Trademark Office, "Non-Final Office Action," issued in connection with U.S. Appl. No. 13/431,432, mailed on Dec. 20, 2013, 12 pages.

*Primary Examiner* — Stephen W Jackson
*Assistant Examiner* — Christopher Clark
(74) *Attorney, Agent, or Firm* — Hanley, Flight & Zimmerman, LLC

(57) ABSTRACT

Methods and systems to detect and control plasma fires are disclosed. An example method includes monitoring an optical fiber using a sensor, the optical fiber being positioned proximate a conductor through which electricity is to flow, the optical fiber not being coupled to a signal generator or a light source; identifying a change in the optical fiber, the change associated with a change in the optical fiber or a casing surrounding the optical fiber due to a plasma fire; and controlling the flow of electricity through the conductor based on identifying the change.

20 Claims, 5 Drawing Sheets

METHODS AND APPARATUS TO DETECT AND CONTROL PLASMA FIRES

This patent arises from a continuation of U.S. patent application Ser. No. 13/431,432 filed Mar. 27, 2012, which is hereby incorporated herein by reference in its entirety.

FIELD OF THE DISCLOSURE

This patent relates to methods and apparatus to detect and control plasma fires.

BACKGROUND

Plasma fires, which may be observed in high current electronic systems (e.g., circuit boards, equipment bays, power distribution systems, etc.), are difficult to detect because they do not create an abnormally high current flow through the electronic system. Thus, overcurrent protections such as circuit breakers, fuses, electronic detectors, etc., are typically unable to detect a plasma fire (i.e., an electronic plasma fire) even as the plasma fire is being fed more energy. In electronic systems of aircrafts, plasma fires pose a serious danger if undetected and uncontrolled.

SUMMARY

An example method includes monitoring an optical fiber using a sensor, the optical fiber being positioned proximate a conductor through which electricity is to flow, the optical fiber not being coupled to a signal generator or a light source; identifying a change in the optical fiber, the change associated with a change in the optical fiber or a casing surrounding the optical fiber due to a plasma fire; and controlling the flow of electricity through the conductor based on identifying the change.

The features, functions, and advantages that have been discussed can be achieved independently in various embodiments or may be combined in yet other embodiments further details of which can be seen with reference to the following description and drawings.

DETAILED DESCRIPTION

Figure 1:
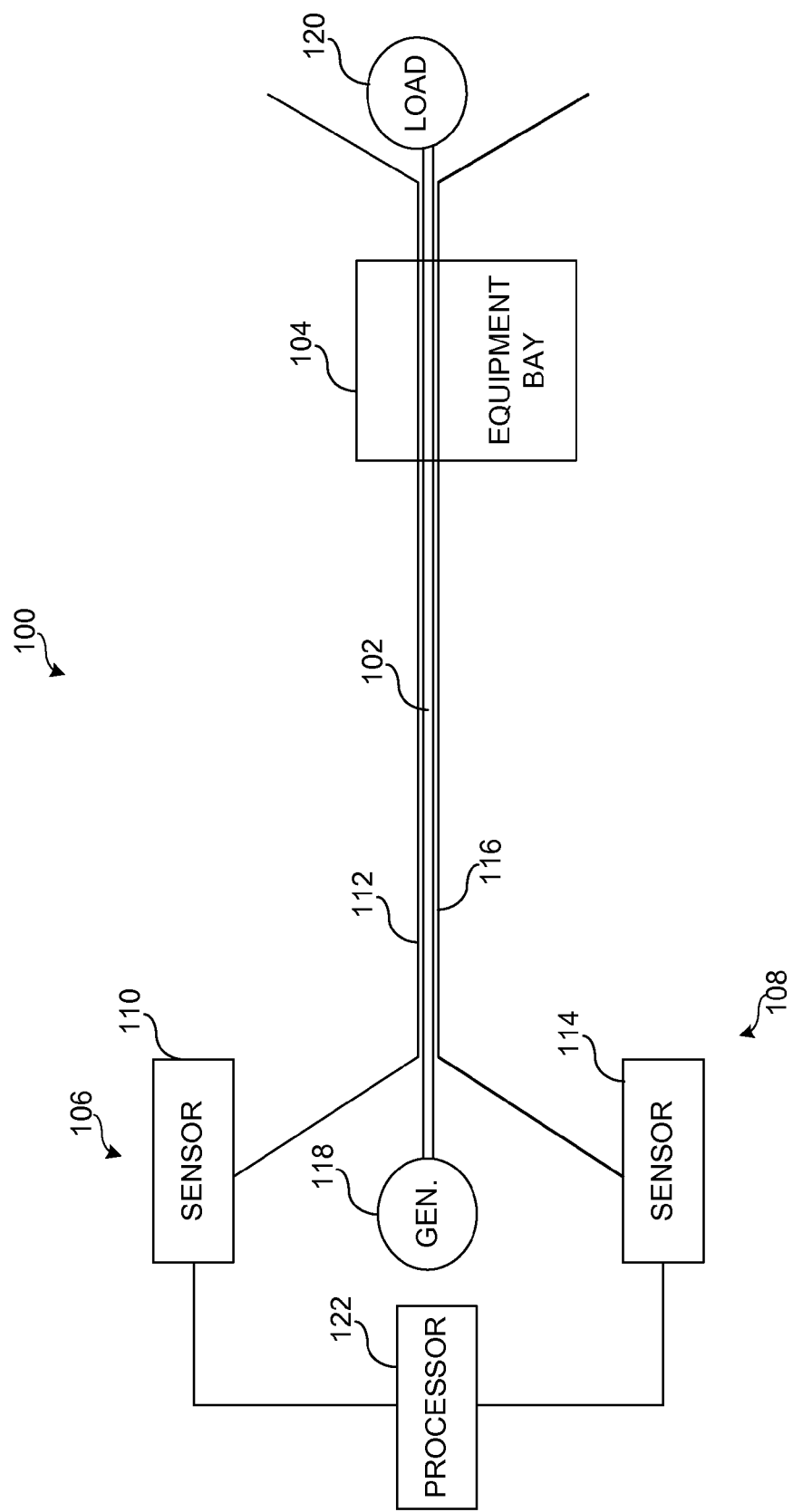
FIG. 1 is an illustration of an example passive plasma fire detection apparatus that can be used to implement the examples disclosed herein.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples disclosed herein relate to apparatus and methods to detect and control plasma fires in, for example, aircrafts, vehicles, ground based applications, missiles, etc. Plasma fires, which may be observed in high current electronic systems (e.g., circuit boards, equipment bays, power distribution systems, etc.), are difficult to detect because they do not create an abnormally high current flow. Thus, overcurrent protections such as circuit breakers, fuses, electronic detectors, etc., typically are unable to detect an electronic circuit anomaly even as the plasma fire (i.e., an electronic plasma fire) is being fed more energy.

In an aircraft, a short or an arc from an electrical cable, circuit board, electronic bay, etc., may initiate a plasma fire. Using passive and/or active plasma fire detection apparatus, the examples disclosed herein may be used to protect highly distributed wiring and circuits from the damage of a plasma fire. In the passive and active apparatus, one or more cables, optical fibers, etc., are positioned adjacent and/or proximate an electrical cable, a circuit board, an electronic bay and/or any other conductor or element where a plasma fire may occur. A conductor is a material through which electricity flows such as, for example, copper, silver, aluminum, etc., and may in the form of electrical wires, electrical cables, circuit boards, electronic bays, etc. The optical fiber may be covered to prevent ambient light from entering the optical fiber.

In the example passive apparatus described herein, a receiver and/or sensor may be coupled to a first end of an optical cable (e.g., a dark optical fiber) and a second end of the optical cable may be free and/or not directly coupled to a sensor. In the example active apparatus described herein, a receiver and/or sensor may be coupled to a first end of an optical cable and a transmitter may be coupled to a second end of the optical cable. In some examples, to enable a determination to be made of the severity of a plasma fire, multiple cables and/or cable casings having different melt points are used with the examples disclosed herein. Each optical cable may have an associated sensor, transmitter and/or receiver.

In operation of the example passive apparatus, electricity flows through an electrical conductor, such as a cable, circuit board, an electronic bay, etc. If a plasma fire occurs, the plasma fire melts and/or physically changes a portion of an optical cable (e.g., the optical fiber and/or its casing), which enables a signal and/or light from the plasma fire to impinge on and be transmitted through the optical fiber to a sensor. Thus, prior to melting, the optical fiber in the example passive apparatus is a dark fiber (e.g., no signals are able to be conveyed through the optical fiber). Based on receiving the signal and identifying the plasma fire (e.g., a change in the optical cable or fiber), the sensor and/or a controller coupled thereto shuts off a flow of electricity to the elements affected by the plasma fire, for example.

In operation of the example active apparatus, electricity flows through an electrical conductor such as an electrical cable, a circuit board, an electronic bay, etc. and a transmitter transmits a signal and/or light signal through an optical cable (e.g., through an optical fiber) to the receiver. The signal may be a varying signal to enable a determination of a temperature of the optical fiber and/or a location of a heat source (e.g., a plasma fire), if one exists, adjacent to the optical fiber. If a plasma fire occurs, the plasma fire melts and/or physically changes a portion of the optical cable (e.g., the optical fiber and/or its casing) to interrupt and/or change the signal received by a receiver. However, in some examples, a plasma fire may interrupt and/or change the signal received by the receiver without melting and/or physically changing the optical fiber and/or its casing. In such examples, the change in the optical fiber is associated with an increase in temperature such as a change in frequency or other characteristic of the signal being received. Based on identifying the plasma fire (e.g., a change in the optical cable), the sensor and/or controller coupled thereto shuts off electricity flow to the elements affected by the plasma fire, for example.

FIG. 1 depicts an example passive plasma fire detection apparatus 100 that may be used to detect a plasma fire in an electrical conductor such as a cable 102 and/or an equipment bay 104 of an aircraft such as an airplane, a helicopter, etc. In some examples, the apparatus 100 includes a first portion 106 to detect a plasma fire having a first or lower temperature and a second portion 108 to detect a plasma fire having a second or greater temperature. The first portion 106 includes a first sensor 110 and a first optical fiber or cable 112 and the second portion 108 includes a second sensor 114 and a second optical fiber or cable 116. The first and/or second sensors 110, 114 may be photoelectric sensors or optical receivers. The optical fibers 112 and 116 may be positioned adjacent and/or around the electrical cable 102, the equipment bay 104, etc. If the optical fibers 112 and 116 are positioned adjacent the equipment bay 104, the optical fibers 112 and 116 may be placed in close proximity to any components having a high enough power level to be a potential source for a plasma fire. In some examples, the optical fibers 112 and 116, which are covered by a casing to prevent ambient light penetration, may be embedded in and/or encased in a jacket of the electrical cable 102.

In operation, a generator or power source 118 provides electricity or electrical power via the electrical cable 102, the equipment bay 104, etc., to a load 120. If a plasma fire is initiated by, for example, a short or an arc from the electrical cable 102 or the equipment bay 104, heat generated from the plasma fire melts a portion of the first and/or second optical fibers 112 and/or 116 and/or their casings. Melting the optical fibers 112 and/or 116 and/or exposing the optical fibers 112 and/or 116 to light (e.g., the plasma fire) by melting their casing enables a light signal to be introduced into and conveyed through the optical fiber 112 and/or 116 to the respective sensor 110, 114.

The first optical fiber 112 and/or its casing has a different or lower melt point than the second optical fiber 116 and/or its casing. Thus, the severity and/or temperature of a plasma fire may be determined based on which of the optical fibers 112 and/or 116 and/or casings melt. Based on the sensors 110 and/or 114 identifying and/or receiving a light signal, the sensor 110, 114 and/or a processor and/or controller 122 coupled thereto stops the flow of electricity from the generator 118.

While the above example describes the reference numbers 112 and 116 as being optical cables or fibers, in other examples, the reference numbers 112 and/or 116 may correspond to metal wires or cables. A cable may include a plurality of metal wires that forms a rope. In such examples, a plasma fire may change and/or cause an electrical impulse or voltage in the wire 112 and/or 116 that is detected by the respective sensor (e.g., electronic field (emf) sensor and/or a voltage sensor) 110, 114. The change in voltage is thus associated with a plasma fire.

Figure 2:
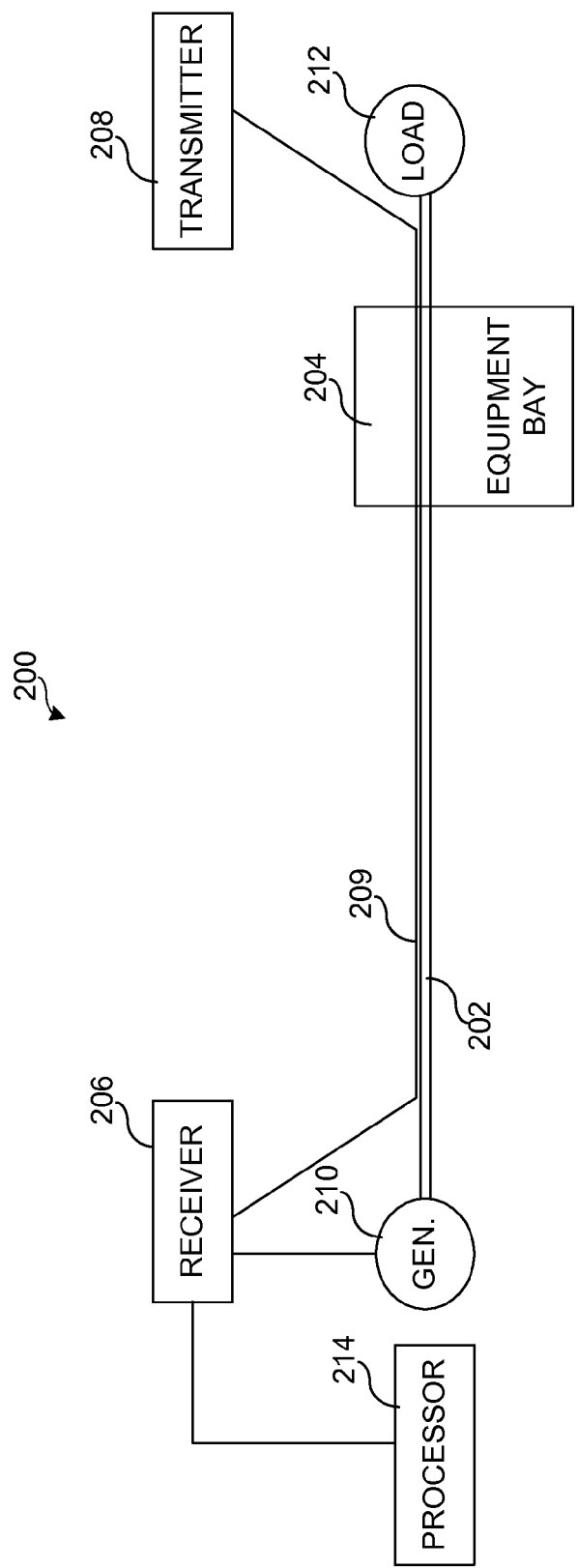
FIG. 2 is an illustration of an example active plasma fire detection apparatus that can be used to implement the examples disclosed herein.

FIG. 2 depicts an example active plasma fire detection apparatus 200 that may be used to detect a plasma fire in electrical conductors such as an electrical cable 202 and/or an equipment bay 204 of an aircraft such as an airplane, a helicopter, etc. In some examples, the apparatus 200 includes a sensor and/or receiver 206, a transmitter 208 and an optical cable or fiber 209 to couple the receiver 206 and the transmitter 208. The transmitter 208 may be an optical transmitter, a diode laser, a light source or a pulse laser, and the receiver 206 may be a photoelectric sensor, an optical receiver or a laser receiver. The optical cable or fiber 209 may be positioned adjacent and/or around the electrical cable 202, the equipment bay 204, etc. In some examples, the optical fiber 209 may be embedded in and/or encased in a jacket of the electrical cable 202.

In operation, a generator or power source 210 provides electricity or electrical power via the electrical cable 202, the equipment bay 204 to a load 212 and the transmitter 208 transmits a light signal through the optical fiber 209 to the receiver 206. If a plasma fire is initiated by, for example, a short or an arc from the electrical cable 202 or the equipment bay 204, heat generated from the plasma fire melts a portion of the optical fiber 209 and/or its casing, which disturbs and/or changes the signal being transmitted through the optical fiber 209 to the receiver 206. However, in other examples, a plasma fire may interrupt and/or change the signal received by the receiver 206 without melting the optical fiber and/or its casing. Based on identifying a change in the light signal received, the receiver 206 and/or a processor and/or controller 214 coupled thereto stops the flow of electricity from the generator 210. Alternatively, based on identifying a change in the light signal received, the receiver 206 and/or a processor and/or controller 214 coupled thereto changes the flow of electricity from the generator 210. The change in the flow of electricity may include throttling the flow of electricity, limiting the flow of electricity, redirecting the flow of electricity and/or adjusting the flow of electricity per one or more control algorithms of the processor 214. In some examples, the control algorithms consider optic fiber routing, system power redundancies, overall safety considerations, power rerouting pathways and/or any other considerations that would enable further safe operation of the aircraft or affected system.

Figure 3:
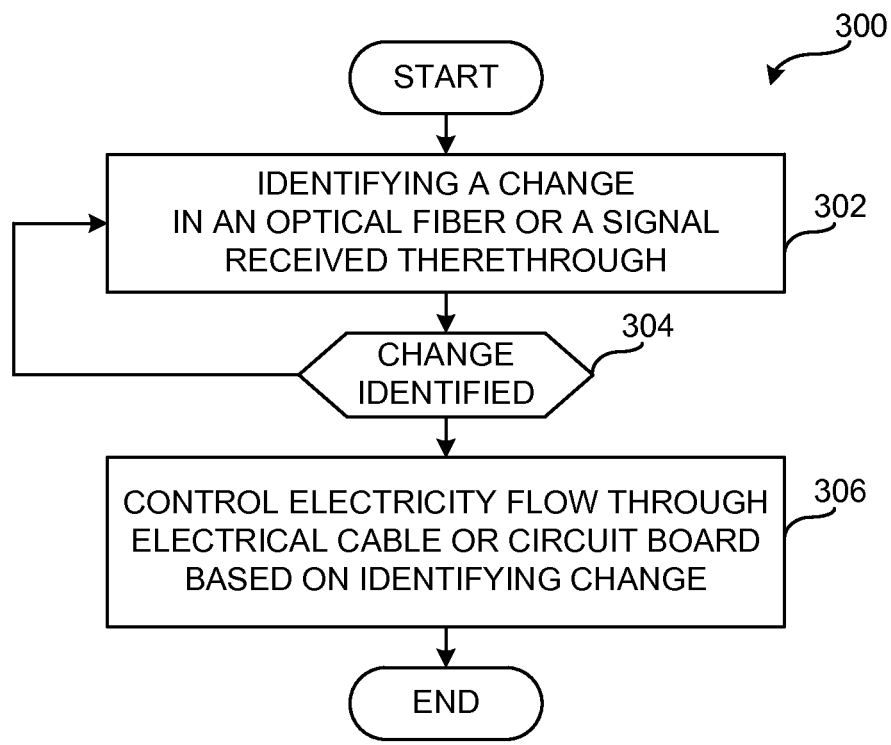
FIG. 3 depicts an example method that can be used to implement the examples disclosed herein.

A flowchart representative of an example method 300 for implementing the the sensors 110, 114, the receiver 206, the processors 122, 214 and/or the transmitter 208 is shown in FIG. 3. In this example, the method 300 comprises a program for execution by a processor such as the processor 402 shown in the example computer 400 discussed below in connection with FIG. 4. The program may be embodied in software stored on a tangible computer readable medium such as a CD-ROM, a floppy disk, a hard drive, a digital versatile disk (DVD), a BluRay disk, or a memory associated with the processor 402, but the entire program and/or parts thereof could alternatively be executed by a device other than the processor 402 and/or embodied in firmware or dedicated hardware. Further, although the example program is described with reference to the flowchart illustrated in FIG. 3, many other methods of implementing the example the sensors 110, 114, the receiver 206, the processors 122, 214 and/or the transmitter 208 may alternatively be used. For example, the order of execution of the blocks may be changed, and/or some of the blocks described may be changed, eliminated, or combined.

As mentioned above, the example operations of FIG. 3 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals.

FIG. 3 is an example method 300 that can be used to detect and control a plasma fire. One or more sensors 110, 114 and/or 206 may be used to monitor and/or identify a change in the optical fibers 112, 116 and/or 209 and/or a signal received therethrough (block 302). At block 304, the sensor 110, 114 and/or 206 and/or the processor 122 and/or 214 determine if a change has been identified (block 304). In some examples, the change may be associated with a plasma fire melting a portion of the optical fiber 112 and/or 116 and/or its casing to enable light to be induced into and conveyed to one or more of the sensors 110 and/or 114. In other examples, the change may be associated with a plasma fire changing and/or disrupting a light signal being conveyed from the transmitter 208 to the receiver 206. If a change is identified, the sensor 110, 114 and/or 206 and/or the processor 122 and/or 214 controls and/or shuts off a flow of electricity through the electrical cable 102, 202 and/or the equipment bay 104, 204 (block 306).

Figure 4:
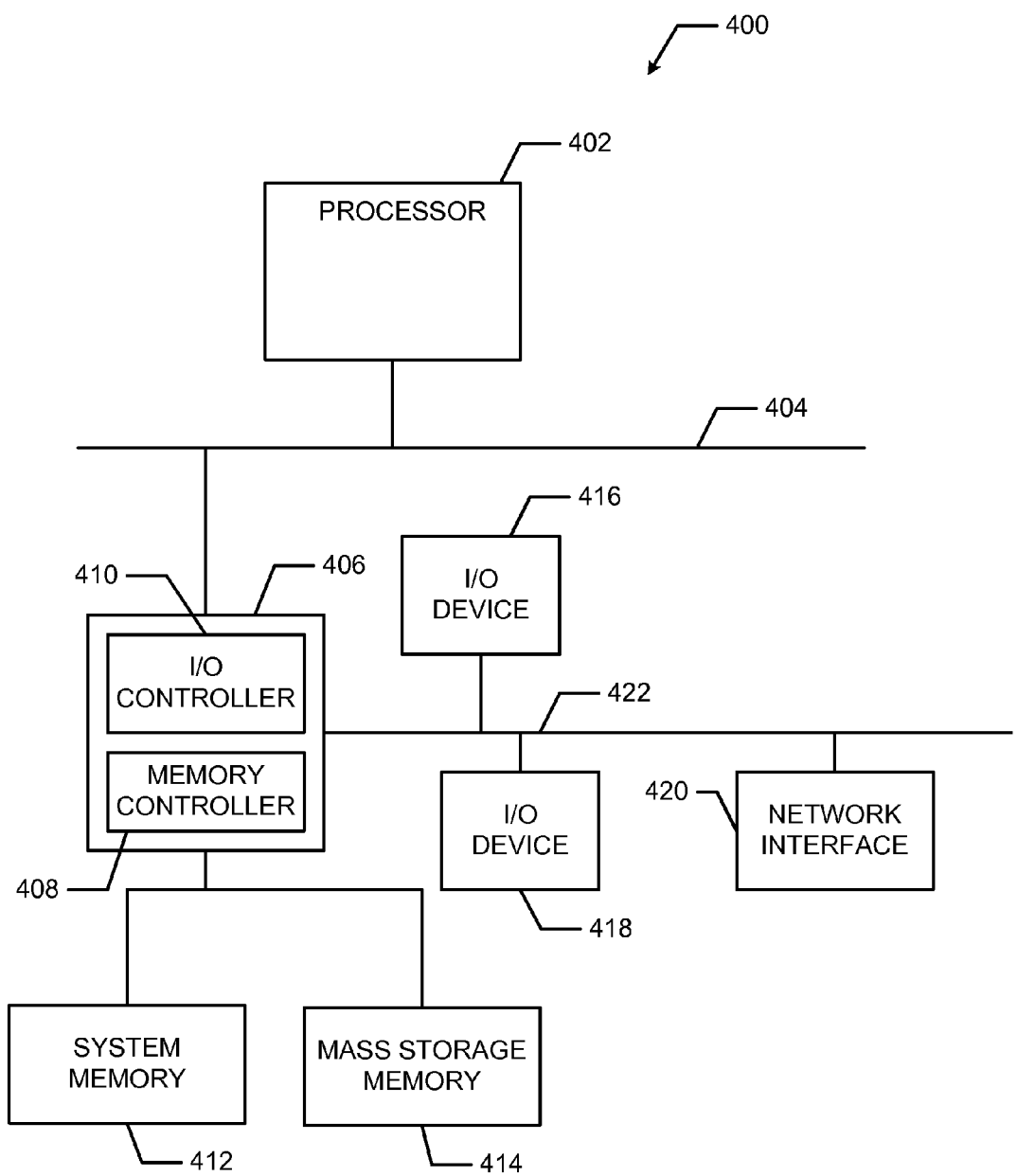
FIG. 4 is a schematic illustration of an example processor platform that may be used and/or programmed to implement any or all of the example methods and apparatus disclosed herein.

FIG. 4 is a block diagram of an example processor system 400 capable of executing the instructions of FIG. 4 to implement the sensors 110, 114, the receiver 206, the processors 122, 214 and/or the transmitter 208 or any of the examples disclosed herein. As shown in FIG. 4, the processor system 400 includes a processor 402 that is coupled to an interconnection bus 404. The processor 402 may be any suitable processor, processing unit or microprocessor. Although not shown in FIG. 4, the processor system 400 may be a multi-processor system and, thus, may include one or more additional processors that are identical or similar to the processor 402 and that are communicatively coupled to the interconnection bus 404.

The processor 402 of FIG. 4 is coupled to a chipset 406, which includes a memory controller 408 and an input/output (I/O) controller 410. As is well known, a chipset typically provides I/O and memory management functions as well as a plurality of general purpose and/or special purpose registers, timers, etc. that are accessible or used by one or more processors coupled to the chipset 406. The memory controller 408 performs functions that enable the processor 402 (or processors if there are multiple processors) to access a system memory 412 and a mass storage memory 414.

The system memory 412 may include any desired type of volatile and/or non-volatile memory such as, for example, static random access memory (SRAM), dynamic random access memory (DRAM), flash memory, read-only memory (ROM), etc. The mass storage memory 414 may include any desired type of mass storage device including hard disk drives, optical drives, tape storage devices, etc.

The I/O controller 410 performs functions that enable the processor 402 to communicate with peripheral input/output (I/O) devices 416 and 418 and a network interface 420 via an I/O bus 422. The I/O devices 416 and 418 may be any desired type of I/O device such as, for example, a keyboard, a video display or monitor, a mouse, etc. The network interface 420 may be, for example, an Ethernet device, an asynchronous transfer mode (ATM) device, an 802.11 device, a DSL modem, a cable modem, a cellular modem, etc. that enables the processor system 400 to communicate with another processor system.

While the memory controller 408 and the I/O controller 410 are depicted in FIG. 4 as separate blocks within the chipset 406, the functions performed by these blocks may be integrated within a single semiconductor circuit or may be implemented using two or more separate integrated circuits.

Figure 5:
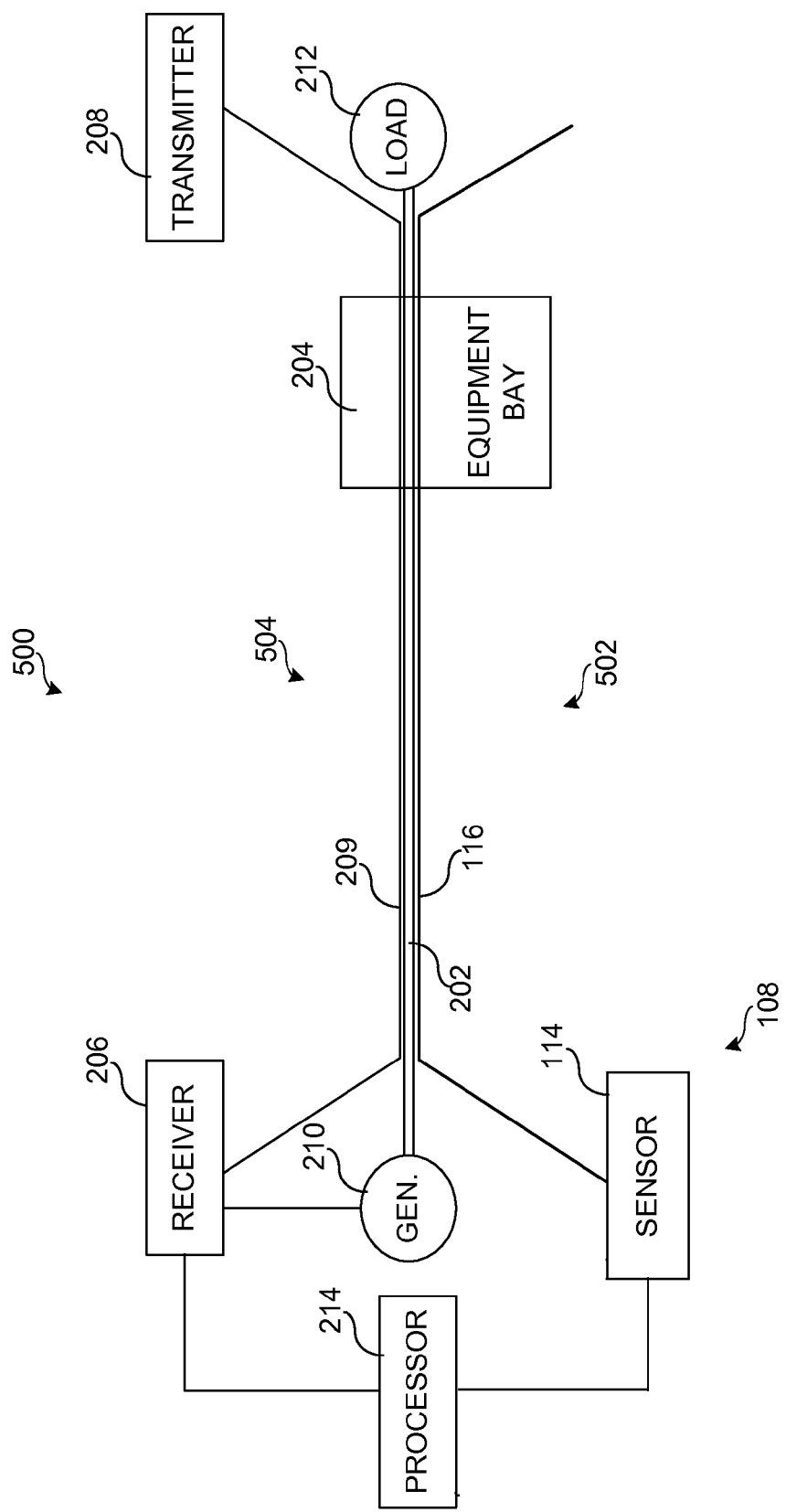
FIG. 5 is an illustration of an example plasma fire detection apparatus that can be used to implement the examples disclosed herein.

FIG. 5 depicts an example plasma fire detection apparatus 500 including an example passive fire detection apparatus 502 and an example active fire detection apparatus 504. The example passive plasma fire detection apparatus 502 functions similarly to the example passive plasma fire detection apparatus 100 of FIG. 1 and the example active fire detection apparatus 504 functions similarly to the example active fire detection apparatus 200 of FIG. 2 and, thus, the same reference numbers have been used to identify the same or similar elements.

As set forth herein, an example apparatus includes a first optical fiber proximate a conductor through which electricity is to flow; a sensor to identify a change in a signal received via the optical fiber, the change associated a physical change in the optical fiber or a casing surrounding the first optical fiber; and a controller to control a flow of electricity through the conductor based on the change in the signal. In some examples, the apparatus is for use on an aircraft. In some examples, the physical change is associated with the plasma fire melting a portion of the first optical fiber or the casing. In some examples, the sensor is responsive to a light signal conveyed via the first optical fiber. In some examples, the first optical fiber includes a dark optical fiber. In some examples, the apparatus includes a transmitter to transmit the signal through the first optical fiber to the sensor. In some examples, the transmitter includes an optical transmitter, a diode laser, a light source, or a pulse laser.

In some examples, the signal includes a varying frequency signal to enable a determination of at least one of a temperature of the first optical fiber or a location of a heat source adjacent the first optical fiber. In some examples, the sensor includes at least one of a photoelectric sensor, an optical receiver, or a laser receiver. In some examples, the apparatus includes a second optical fiber proximate the conductor, the first optical fiber or the casing includes a first melt point and the second optical fiber or casing surrounding the second optical fiber including a second melt point.

An example apparatus includes a cable to be positioned proximate a conductor, electricity to flow through the conductor; a sensor to identify a change in the cable, the change associated with a plasma fire; and a controller to control a flow of electricity through the conductor in response to the change. In some examples, the change includes a change in a voltage received by the sensor. In some examples, the change includes a physical change in the cable. In some examples, the cable includes a metal wire or an optical fiber.

An example method includes identifying a change in an optical fiber, the change associated with a change in the optical fiber or a casing surrounding the optical fiber, the optical fiber proximate a conductor through which electricity flows; and controlling the electricity flow through the conductor based on identifying the change. In some examples, identifying the change includes receiving a signal associated with a plasma fire melting a portion of the optical fiber or an associated casing. In some examples, the change includes exposing a portion of the optical fiber to light. In some examples, identifying the change includes receiving a different signal from a transmitter associated with a plasma fire melting a portion of the optical fiber or an associated casing. In some examples, the change includes a physical change in the optical fiber. In some examples, controlling the electricity flow includes one or more of shutting off the electricity flow, throttling the electricity flow, limiting the electricity flow, redirecting the electricity flow, or adjusting the electricity flow.

An example apparatus includes an optical fiber to be positioned proximate a conductor, the optical fiber not being coupled to a signal generator or light source, electricity to flow through the conductor; a sensor to identify a change in the optical fiber, the change associated with a plasma fire; and a controller to control a flow of electricity through the conductor in response to the change. In some examples, the optical fiber includes a first optical fiber and the sensor includes a first sensor, and further including: a second optical fiber proximate the conductor; a transmitter to transmit a signal through the second optical fiber; a second sensor to identify a change in the signal transmitted via the second optical fiber, the change associated with a physical change in the second optical fiber or a casing surrounding the second optical fiber; and the controller to, based on the change in the signal: control a flow of electricity through the conductor.

In some examples, the apparatus is for use on an aircraft. In some examples, the physical change is associated with a plasma fire melting a portion of the second cable or the second casing. In some examples, the signal is a light signal and the second sensor is responsive to the light signal. In some examples, the optical fiber includes a dark optical fiber. In some examples, the apparatus includes a transmitter to transmit the signal through the cable to the second sensor. In some examples, the transmitter includes an optical transmitter, a diode laser, a light source, or a pulse laser. In some examples, based on the change in the signal, the controller is to determine at least one of a temperature of the cable or a location of a heat source adjacent the cable. In some examples, the second sensor includes at least one of a photoelectric sensor, an optical receiver, or a laser receiver.

In some examples, the optical fiber includes a first optical fiber and a first casing surrounding the first optical fiber, the sensor includes a first sensor, and further including a cable proximate the conductor, the first optical fiber or the first casing including a first melt point and the cable or a second casing surrounding the cable including a second melt point, the first melt point being different than the second melt point; a second sensor to identify a change in a signal received via the cable, the change associated with a physical change in the cable or the second casing surrounding the cable, wherein the controller to control a flow of electricity through the conductor based on the change in the signal.

In some examples, the change includes a change in a voltage received by the cable. In some examples, the change includes a physical change in the optical fiber. In some examples, the cable includes a metal wire or an optical fiber. In some examples, the change is associated with the plasma fire melting a portion of the optical fiber or an associated casing. In some examples, the physical change includes exposing a portion of the cable to light created by a plasma fire. In some examples, the change includes a different signal received from a transmitter associated with the plasma fire melting a portion of the cable or the second casing. In some examples, the change includes an increase in a frequency of the signal. In some examples, the sensor is responsive to a light signal conveyed via the optical fiber, the light signal being generated by the plasma fire.

Furthermore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method, comprising:
   monitoring an optical fiber using a sensor, the optical fiber being positioned proximate a conductor through which electricity is to flow, the optical fiber not being coupled to a signal generator or a light source;
   identifying a change in the optical fiber, the change associated with a change in the optical fiber or a casing surrounding the optical fiber due to a plasma fire; and
   controlling the flow of electricity through the conductor based on identifying the change.

2. The method of claim 1, wherein identifying the change includes receiving a signal associated with the plasma fire melting a portion of the optical fiber or the associated casing.

3. The method of claim 2, wherein the signal is a light signal and the sensor is responsive to the light signal.

4. The method of claim 1, wherein the change includes exposing a portion of the optical fiber to light.

5. The method of claim 1, wherein the optical fiber includes a first optical fiber, the casing includes a first casing, and the sensor includes a first sensor, and further including:
   monitoring a second optical fiber using a second sensor, the second optical fiber being positioned proximate the conductor;
   identifying a change in the second optical fiber, the change associated with a change in the second optical fiber or a second casing surrounding the second optical fiber due to the plasma fire; and
   controlling the flow of electricity through the conductor based on identifying the change.

6. The method of claim 5, further including transmitting a signal through the second optical fiber using a transmitter.

7. The method of claim 6, wherein identifying the change includes receiving a different signal from the transmitter.

8. The method of claim 6, wherein the transmitter is an optical transmitter, a diode laser, a light source, or a pulse laser.

9. The method of claim 1, wherein the optical fiber includes a first optical fiber, the casing includes a first casing, and the sensor includes a first sensor, further including:
   monitoring a cable using a second sensor, the cable being positioned proximate the conductor;
   identifying a change in the cable, the change associated with a change in the cable or a second casing surrounding the cable due to the plasma fire; and
   controlling the flow of electricity through the conductor based on identifying the change.

10. The method of claim 9, further including transmitting a signal through the cable using a transmitter.

11. The method of claim 10, further including, in response to the change in the signal, determining at least one of a temperature of the cable or a location of a heat source adjacent the cable.

12. The method of claim 10, wherein the change includes an increase in a frequency of the signal.

13. The method of claim 9, wherein the first optical fiber or the first casing includes a first melt point and the cable or the second casing surrounding the cable includes a second melt point, the first melt point being different than the second melt point.

14. The method of claim 9, wherein the change includes a change in a voltage received by the cable.

15. The method of claim 9, wherein the cable includes a metal wire or an optical fiber.

16. The method of claim 1, wherein controlling the electricity flow includes one or more of shutting off the electricity flow, throttling the electricity flow, limiting the electricity flow, redirecting the electricity flow, or adjusting the electricity flow.

17. The method of claim 1, wherein monitoring the optical fiber includes monitoring the optical fiber on an aircraft.

18. The method of claim 1, wherein the optical fiber is a dark optical fiber.

19. The method of claim 1, wherein the sensor is at least one of a photoelectric sensor, an optical receiver, or a laser receiver.

20. The method of claim 1, wherein the sensor is responsive to a light signal conveyed via the optical fiber, the light signal being generated by the plasma fire.

* * * * *